(12) United States Patent
Zwilling (10) Patent No.: US 11,990,751 B1
(45) Date of Patent: May 21, 2024

(54) POWER SPLITTING DEVICE

(71) Applicant: Matthew Zwilling, New Haven, CT (US)

(72) Inventor: Matthew Zwilling, New Haven, CT (US)

(*) Notice: Subject to any disclaimer, the term of this patent is extended or adjusted under 35 U.S.C. 154(b) by 0 days.

(21) Appl. No.: 18/098,745

(22) Filed: Jan. 19, 2023

(51) Int. Cl.
*H02J 3/14* (2006.01)
*H02J 3/32* (2006.01)

(52) U.S. Cl.
CPC .............. *H02J 3/144* (2020.01); *H02J 3/32* (2013.01); *H02J 2310/14* (2020.01); *H02J 2310/48* (2020.01); *H02J 2310/60* (2020.01)

(58) Field of Classification Search
CPC .......... H02J 3/144; H02J 3/32; H02J 2310/14; H02J 2310/48; H02J 2310/60
See application file for complete search history.

(56) References Cited

U.S. PATENT DOCUMENTS

| | | | |
|---|---|---|---|
| 2008/0145724 A1* | 6/2008 | McCary | H01M 8/0612 429/515 |
| 2012/0032636 A1* | 2/2012 | Bianco | B60L 53/63 320/109 |

* cited by examiner

*Primary Examiner* — Lincoln D Donovan
*Assistant Examiner* — Alex W Lam
(74) *Attorney, Agent, or Firm* — The Iwashko Law Firm, PLLC; Lev Ivan Gabriel Iwashko (57) ABSTRACT

A power splitting device, including a main body, a power inlet disposed on the main body to connect the main body to a power outlet, a dryer outlet disposed on at least a portion of the main body to receive a connection from a dryer therein and provide power received from the power inlet to the dryer, an electric vehicle outlet disposed on the main body to receive a connection from an electric vehicle supply equipment (EVSE) therein and provide power received from the power inlet to the EVSE, such that the power output of the EV outlet is greater than the dryer outlet, a stepped battery disposed within the main body to send power to the EV outlet, and a control unit disposed within the main body to monitor power output from the dryer outlet or the EV outlet, and adjust the power output based on a setting.

18 Claims, 2 Drawing Sheets

POWER SPLITTING DEVICE

BACKGROUND

1. Field

The present general inventive concept relates generally to electrical power, and particularly, to a power splitting device.

2. Description of the Related Art

Electric vehicles (EV), such as automotive vehicles, use at least one electric motor for propulsion. Electricity can be generated from a battery, solar panels, and/or fuel cells. Moreover, there are several different types of electric vehicles including battery electric vehicles (BEV), plug-in hybrid electric vehicles (PHEV), and/or hybrid electric vehicles (HEV).

Regardless of the type of EV, the battery is drained during use, and will eventually require recharging. Although many vehicle manufacturers offer a home charging unit, it typically requires an invasive and multiple step process. Specifically, a potential buyer of the EV will need clearance from a county and/or a state governing body for electricity modifications, electrical panel modifications, installation and/or modification of wiring, and/or installation of the home charging unit. Unfortunately, the potential buyer that is also renting an apartment or a home usually cannot make such modifications. As such, the renter has a logistical barrier to purchasing the EV.

Currently, the home charging unit offered by electric vehicle manufacturers come in two forms. First, a level one charger for the EV that uses standard 120-volt (V) alternating current (AC) outlet, which delivers 1.3 kiloWatt (kW) to 2.4 kW of power (i.e., electricity). While widely available in most buildings, these types of chargers are not practical in most cases.

Another type of the home charging unit is a level two charger, which uses a 240-volt (V) outlet that delivers 6.2 kW to 19.2 kW of power. In most homes, the 240V outlet is often limited to a dryer as it is a high-powered appliance.

Some power splitters allow connection to the 240V outlet that divides use of the dryer with charging the EV. However, all the power splitters will only allow use of either the dryer or charging the EV at any given time. In other words, while the dryer is operating, charging the EV is disabled. The lack of simultaneous operating capacity is very inconvenient.

Therefore, there is a need for a power splitting device that allows simultaneous use of the dryer and charging of the EV, as well as, increases amperage during charging by the EV.

SUMMARY

The present general inventive concept provides a power splitting device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a power splitting device, including a main body, a power inlet disposed on at least a portion of the main body to removably connect the main body to a power outlet, a dryer outlet disposed on at least a portion of the main body to receive a connection from a dryer therein and provide power received from the power inlet to the dryer, an electric vehicle (EV) outlet disposed on at least a portion of the main body to receive a connection from an electric vehicle supply equipment (EVSE) therein and provide power received from the power inlet to the EVSE, such that the power output of the EV outlet is greater than the dryer outlet, a stepped battery disposed within at least a portion of the main body to send power to the EV outlet, and a control unit disposed within at least a portion of the main body to monitor power output from at least one of the dryer outlet and the EV outlet, and adjust the power output based on a setting.

The dryer outlet may be fixed to 240V and 30 A for the power output.

The EV outlet may be fixed to 240V and 50 A for the power output.

The EV outlet may have an increased amperage level with respect to an amperage level of the power inlet in response to receiving power from the stepped battery.

The control unit may allow simultaneous output of the power output to the dryer outlet and the EV outlet.

The control unit may prevent degradation of the power output to the dryer outlet and the EV outlet during simultaneous output of the power output.

The control unit may enforce overcurrent protection in response to determining at least one of the dryer outlet and the EV outlet exceed a predetermined outlet threshold.

The control unit may enforce overheating protection in response to determining the stepped battery has exceeded a predetermined temperature level.

The control unit may separate the power output for the dryer outlet to receive power only from the power inlet and the EV outlet to receive power only from the stepped battery.

The EV outlet may receive power only from the stepped battery and the amperage level of the EV outlet remains steady.

The EV outlet may receive 240V and 30 A for the power output while the EV outlet receives power only from the stepped battery.

The control unit may prevent access to the stepped battery in response to a battery capacity falling below a predetermined threshold.

The control unit may automatically disable the power output to the EV outlet in response to determining an unauthorized vehicle is connected to the EVSE.

The control unit may automatically disable receipt of power by the power inlet and the power output from the dryer outlet and the EV outlet in response to contact of at least one of an outer surface of the main body and an inner surface of the main body by a user to prevent risk of electrical shock.

The power splitting device may further include a communication unit disposed within at least a portion of the main body to facilitate communication and control of the control unit with an external device, such that the control unit sends an alert using the communication unit to the external device in response to detecting completion of a drying cycle by the dryer.

The control unit may monitor the external device to determine a loss of power to the power inlet is based on at least one of a power outage and a tripped circuit breaker.

The power splitting device may further include a plurality of necessity outlets disposed on at least a portion of the main body to provide the power output only from the stepped battery in response to the control unit determining the loss of power is based on the power outage, such that the control unit allows the stepped battery to provide the power output at 120V and 15 A to each of the plurality of necessity outlets.

The control unit may notify an external device in response to determining the loss of power is based on the tripped circuit breaker.

The foregoing and/or other features and utilities of the present general inventive concept may also be achieved by providing a power splitting device, including a main body, a power inlet disposed on at least a portion of the main body to removably connect the main body to a power outlet, a dryer outlet disposed on at least a portion of the main body to receive a connection from a dryer therein and provide power received from the power inlet to the dryer, an electric vehicle (EV) outlet disposed on at least a portion of the main body to receive a connection from an electric vehicle supply equipment (EVSE) therein and provide power received from the power inlet to the EVSE, and a stepped battery disposed within at least a portion of the main body to increase an amperage level of the EV outlet.

The dryer outlet and the EV outlet may provide power simultaneously without a reduction of power.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Power Splitting Device 100
Main Body 110
Power Inlet 120
Dryer Outlet 130
Electric Vehicle Outlet 140
Stepped Battery 150
Control Unit 160
Input Unit 161
Display Unit 162
Processing Unit 163
Storage Unit 164
Communication Unit 170
Necessity Outlets 180
Power Splitting Device 200
Main Body 210
Power Inlet 220
Dryer Outlet 230
Electric Vehicle Outlet 240
Stepped Battery 250
Electric Vehicle Supply Equipment Controller 260
Necessity Outlets 270

Figure 1:
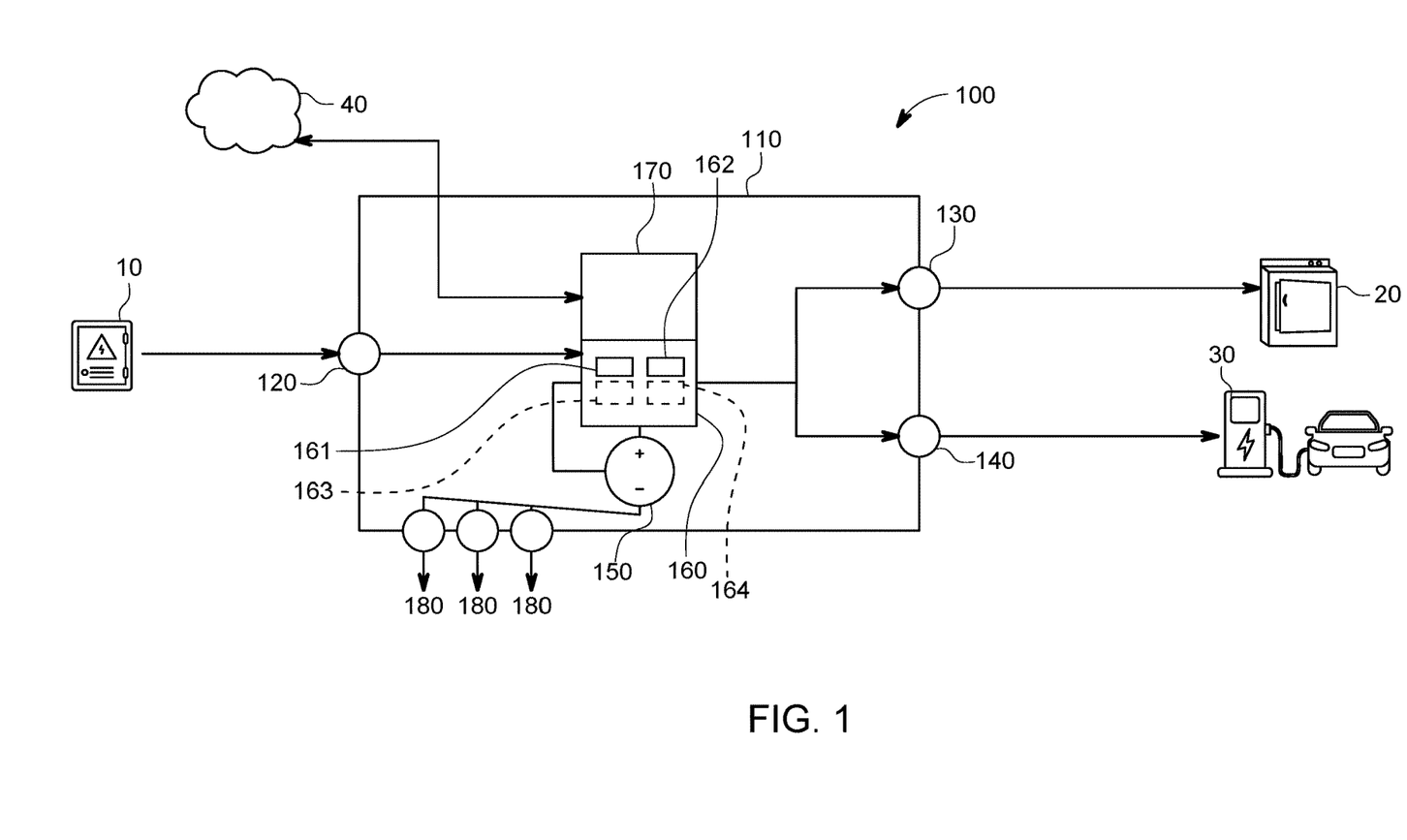
FIG. 1 illustrates a schematic view of a power splitting device, according to an exemplary embodiment of the present general inventive concept.

FIG. 1 illustrates a schematic view of a power splitting device 100, according to an exemplary embodiment of the present general inventive concept.

The power splitting device 100 may be constructed from at least one of metal, plastic, wood, glass, and rubber, etc., but is not limited thereto.

The power splitting device 100 may include a main body 110, a power inlet 120, a dryer outlet 130, an electric vehicle (EV) outlet 140, a stepped battery 150, a control unit 160, a communication unit 170, and a plurality of necessity outlets 180, but is not limited thereto.

The main body 110 may be constructed to have ingress protection (IP). Specifically, the main body 110 may have an IP rating of sixty-seven (67) to protect against foreign matter that may cause electrical faults, fire, and/or an explosion. The main body 110 may be a portable size. Moreover, the main body 110 may be removably (i.e., detachably) connected to at least a portion of a power outlet 10.

The power inlet 120 may be disposed on at least a portion of the main body 110. The power inlet 120 may be constructed as a two-prong plug, a three-prong plug, and/or a four-prong plug. In other words, the power inlet 120 may be constructed based on a type of the power outlet 10. Also, the power inlet 120 may include a cord of a predetermined length (e.g., two feet, five feet, ten feet, twenty feet) based on a preference of a user and/or a manufacturer. The variability in length of the cord may provide flexibility in placement and/or usage of the main body 110.

The power inlet 120 may be removably connected (i.e., inserted) within the power outlet 10. More specifically, the power inlet 120 may removably connect to a 240-volt (V) and 30 amperes (A) power outlet.

The dryer outlet 130 may be disposed on at least a portion of the main body 110. The dryer outlet 130 may be constructed as a two-prong plug, a three-prong plug, and/or a four-prong plug. In other words, the dryer outlet 130 may be constructed based on a type of a power inlet of a dryer 20 and/or any other device connected thereto. Also, the dryer outlet 130 may include a cord of a predetermined length (e.g., two feet, five feet, ten feet, twenty feet) based on the preference of the user and/or the manufacturer. The variability in length of the cord may provide flexibility in placement and/or usage of the main body 110.

The dryer outlet 130 may have a fixed configuration. For example, the dryer outlet 130 may output a 240V and 30 A of power. Additionally, the power output of the dryer outlet 130 may remain constant (i.e., stable) in response to the dryer 20 being connected thereto, due to most dryers requiring a stable power input from the power outlet 10. Thus, the dryer outlet 130 may receive a connection (e.g., a plug) from the dryer 20 therein. The dryer outlet 130 may provide power to the dryer 20 while the dryer 20 remains connected to the dryer outlet 130.

Alternatively, the dryer outlet 130 may be adjusted to have a variable configuration. More specifically, the power output of the dryer outlet 130 may be adjusted based on the type of device connected thereto. However, the dryer outlet 130 may remain constant and/or unchangeable in response to the dryer outlet 130 being connected to the dryer 20.

The EV outlet 140 may be disposed on at least a portion of the main body 110. The EV outlet 140 may be constructed as a two-prong plug, a three-prong plug, and/or a four-prong plug. In other words, the EV outlet 140 may be constructed based on a type of a power inlet of an electric vehicle supply equipment (EVSE) 30 and/or any other device connected thereto. Also, the EV outlet 140 may include a cord of a predetermined length (e.g., two feet, five feet, ten feet, twenty feet) based on the preference of the user and/or the manufacturer. The variability in length of the cord may provide flexibility in placement and/or usage of the main body 110.

The EV outlet 140 may have a variable configuration. The EV outlet 140 may output 240V and 50 amperes (A) of power. Thus, the power output of the EV outlet 140 may be greater than the power output of the dryer outlet 130. However, the EV outlet 140 may output the amperage based on needs of an EV connected to the EVSE 30, such as increasing an amperage level and/or decreasing the amperage level. Thus, the EV outlet 140 may receive a connection (e.g., a plug) from the EVSE 30 therein. The EV outlet 140 may provide power to the EVSE 30 while the EVSE 30 remains connected to the EV outlet 140.

Each cord used for the power inlet 120, the dryer outlet 130, and/or the EV outlet 140 may be based on needs of the user and/or a location of residence (e.g., rental). For example, the EVSE 30 may be located in a garage and/or outside of the garage, while the dryer 20 is within the residence. Accordingly, each cord for the power inlet 120, the dryer outlet 130, and/or the EV outlet 140 may have variable length to easily connect to the power inlet 10 and/or the dryer 20 while being able to reach the EVSE 30.

The stepped battery 150 may include a rechargeable battery, but is no limited thereto. For example, the stepped battery 150 may include a lithium-ion (Li-ion) battery, a lithium-ion polymer (Li-ion polymer) battery, a nickel-cadmium (NiCd) battery, a nickel-iron (NiFe) battery, a nickel-metal hydride (NiMH) battery, a sodium-ion battery, a vanadium redox battery, a molten salt battery, a quantum battery, and/or any combination thereof, but is not limited thereto.

The stepped battery 150 may be disposed within at least a portion of the main body 110. The stepped battery 150 may charge in response to receiving power from the power inlet 120.

However, the stepped battery 150 may discharge power therefrom to add, supplement, and/or increase (i.e., step up) the amperage level to the EV outlet 140 during use. More specifically, the stepped battery 150 may increase the amperage level to the EV outlet 140 from 30 A to 50 A and/or 60 A in response to the EVSE 30 being connected to the EV. Thus, the amperage level of the EV outlet 140 may be greater than the amperage level from the power inlet 120. As such, in absence of the EV outlet 140 being connected to the EV via the EVSE 30, the EV outlet 140 may default to 30 A based on the power from the power inlet 120.

The control unit 160 may include an input unit 161, a display unit 162, a processing unit 163, and a storage unit 164, but is not limited thereto.

The input unit 161 may include a keyboard, a touchpad, a mouse, a trackball, a stylus, a voice recognition unit, a visual data reader, a camera, a wireless device reader, a fingerprint reader, an iris scanner, a facial recognition unit, and a holographic input unit.

The display unit 162 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 162 may be combined with the input unit 161 to be a touch-screen.

The processing unit 163 (or central processing unit, CPU) may include electronic circuitry to carry out instructions of a computer program by performing basic arithmetic, logical, control and input/output (I/O) operations specified by the instructions. The processing unit 163 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 163 may also include a microprocessor and a microcontroller. The processing unit 163 may be a local compute device, a remote server, or cloud computing device.

The storage unit 164 may include a random access memory (RAM), a read-only memory (ROM), a hard disk, a flash drive, a database connected to the Internet, cloud-based storage, Internet-based storage, or any other type of storage unit.

The control unit 160 may access the Internet via the communication unit 170 to allow the control unit 160 to access a website, and/or may allow a mobile application and/or the software application to be executed using the processing unit 161. For ease of description, the mobile and/or the software application will be hereinafter referred to as an app. The app may be downloaded from the Internet to be stored on the storage unit 164.

The processing unit 163 executing the app may have configuration and/or settings adjusted using the input unit 161 and/or the display unit 162.

The processing unit 163 executing the app may monitor the power output from the dryer outlet 130 and/or the EV outlet 140. Additionally, the processing unit 163 may determine a type of device connected to the dryer outlet 130 and/or the EV outlet 140 to adjust the power output accordingly. For example, the processing unit 163 may activate the stepped battery 150 to increase the amperage level (e.g., from 30 A to 50 A and/or 60 A) from the EV outlet 140 in response to determining the EVSE 30 is charging the EV. Also, the processing unit 163 may ensure that the power output to the dryer outlet 130 remains constant as described above with respect to the dryer outlet 130.

Moreover, the processing unit 163 may monitor the power output to the dryer outlet 130 and/or the EV outlet 140 to ensure no risk and/or a lack of power overload. The processing unit 163 may adjust the power output to the dryer outlet 130 and/or the EV outlet 140 based on risk of electrical overload. For example, the processing unit 163 may adjust the power output to the EV outlet 140 from 9.6 kW and/or 11 kW for charging of the EV to 7.7 kW in response to determining the dryer outlet 130 is drawing power based on use of the dryer 20. In other words, the processing unit 163 may maintain the power output to the EV outlet 140 as 9.6 kW and/or 11 kW in absence of use of the dryer 20.

As such, the processing unit 163 may apply overcurrent protection and/or overheating protection to prevent the dryer outlet 130 and/or the EV outlet 140 from receiving too much current and/or prevent damage and/or shock from faulty wiring that can cause a fire.

With regard to overcurrent protection, the processing unit 163 may monitor the dryer outlet 130 and/or the EV outlet 140 to ensure the dryer 20 and/or the EVSE 30 remain below a predetermined outlet threshold. In other words, the processing unit 163 may enforce overcurrent protection by disabling the dryer outlet 130 and/or the EV outlet 140 in response to detecting the dryer 20 and/or the EVSE 30 are using more than the 240V and 30 A, and 240V and 50 A thresholds, respectively.

With regard to overheating protection, for example, the processing unit 163 may monitor a temperature level of the stepped battery 150 to ensure the stepped battery 150 is prevented from overheating and/or reaching a predetermined temperature level (e.g., over 130 degrees Fahrenheit). In other words, the processing unit 163 may enforce overheating protection by disabling the power inlet 120 from distributing power to the dryer outlet 130 and/or the EV outlet 140 in response to detecting at least one error, at least one fault, and/or at least one short therein. Similarly, the processing unit 163 may disable the stepped battery 150 from distributing power to the dryer outlet 130 and/or the EV outlet 140 in response to detecting the at least one error, the at least one fault, and/or the at least one short therein.

It is important to note that the processing unit 163 may allow simultaneous power output to the dryer outlet 130 and/or the EV outlet 140 without degradation of the power output. The processing unit 163 may allow continuous full power output to the dryer outlet 130 and/or the EV outlet 140, such that neither the dryer outlet 130 nor the EV outlet 140 decrease the power output due to use of the stepped battery 150 to supplement the power output to the EV outlet 140. In other words, the dryer outlet 130 and/or the EV outlet 140 may simultaneously and/or continuously provide power without the processing unit 163 disabling and/or reducing power output of the other.

Alternatively, in some cases (e.g., dryer 20 has a heavy load to dry, EVSE requires uninterrupted power), the processing unit 163 may determine the power draw from the dryer outlet 130 and/or the EV outlet 140 requires separation of power source, such that the dryer outlet 130 may receive power only from the power inlet 120 while the EV outlet 140 only receives power from the stepped battery 150. Accordingly, the EV outlet 140 may receive less power than combined power output from the power inlet 120 and/or the stepped battery 150. For example, the dryer outlet 130 may receive 240V and 30 A while the EV outlet 140 receives 240V and 30 A. Accordingly, the EV outlet 140 may receive less power (i.e., no increase in the amperage level, steady level of the amperage level) to conserve power draw from the stepped battery 150.

Furthermore, the processing unit 163 executing the app may limit access to the stepped battery 150 in response to loss of power received by the power inlet 120 (i.e., a power outage). The processing unit 163 may prevent access to power from the stepped battery 150 during a power outage, such that the EV outlet 140 may no longer receive power and/or the increase in the amperage level.

Also, the processing unit 163 may monitor a battery capacity of the stepped battery 150. The processing unit 163 may limit and/or prevent access to the stepped battery 150 in response to the battery capacity falling below a predetermined threshold (e.g., twenty percent, fifteen percent, ten percent) with respect to a maximum capacity (i.e., full charge) of the stepped battery 150. Thus, the processing unit 163 may prevent the EV outlet 140 from drawing power from the stepped battery 150 while the stepped battery 150 remains below the predetermined threshold.

The input unit 161 and/or the display unit 162 may be used to receive at least one input thereon to view usage information of the power inlet 120, the dryer outlet 130, the EV outlet 140, and/or the stepped battery 150. The display unit 162 may display the usage information, such as frequency of use of the stepped battery 150, successful increases of the amperage level by the stepped battery 150, a drying cycle of the dryer 20 while connected to the dryer outlet 130, and/or a charge cycle of the EVESE 30 while connected to the EV outlet 140. Additionally, the display unit 162 may be used to display a fault log, including any errors detected by the processing unit 163 while monitoring the power inlet 120, the dryer outlet 130, the EV outlet 140, and/or the stepped battery 150.

The communication unit 170 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet.

The communication unit 170 may be disposed within at least a portion of the main body 110. The communication unit 170 may transmit a signal therefrom in response to a command from the processing unit 163. Additionally, the communication unit 170 may facilitate communication (i.e., wired, wireless) to an external device 40 and/or a network 40.

Additionally, the processing unit 163 executing the app may adjust settings thereon based on at least one input from the external device 40 also running the app. In other words, the external device 40 may execute the app to remotely connect to and/or control operations of the processing unit 163, as well as, the stepped battery 150.

The processing unit 163 may receive commands from the external device 40, the input unit 161, and/or the display unit 162 to generate an alert (e.g., visual, light flash, sound) on the external device 40 and/or the display unit 162 in response to the processing unit 163 determining an unauthorized vehicle is connected to the EVSE 30. Moreover, the processing unit 163 may automatically disable the power output to the EV outlet 140 in response to the processing unit 163 determining the unauthorized vehicle is connected to the EVSE 30.

The processing unit 163 may executing the app may automatically disable via a switch, receipt of power by the power inlet 120 and/or the power output from the dryer outlet 130 and/or the EV outlet 140 in response to contact of an outer surface of the main body 110 and/or an inner surface of the main body 110 by the user to prevent risk of electrical shock to the user and/or any other person. For example, a safety sensor (e.g., a temperature sensor, a touch sensor) may be further included with the processing unit 163.

The processing unit 163 executing the app may monitor operation of the dryer 20 based on the power output used by the dryer outlet 130. The processing unit 163 may send an alert (e.g., a dryer signal) from the communication unit 170 to the external device 40 and/or the display unit 162 identifying completion of the drying cycle.

Similarly, the processing unit 163 executing the app may monitor operation of the EVSE 30 based on the power output used by the EV outlet 140. The processing unit 163 may send an alert (e.g., an EV signal) from the communication unit 170 to the external device 40 and/or the display unit 162 identifying completion of the charging cycle of the EV.

Additionally, with regard to the external device 40, the processing unit 163 may monitor the external device 40 and/or the network 40 to confirm loss of power received by the power inlet 120 is based on the power outage instead of a tripped circuit breaker. Thus, the processing unit 163 may send a breaker signal using the communication unit 170 to the external device 40 and/or the display unit 163 to alert the user of the tripped circuit breaker in response to determining the circuit breaker has been tripped. Also, the processing unit 163 may send a power outage confirmation request to at least one third party using the communication unit 170 over the network 40, such as a utility company and/or a power company to confirm the power outage is based on failure of power from the utility company and/or the power company.

The plurality of necessity outlets 180 may be disposed on at least a portion of the main body 110 and/or connected to the stepped battery 150. Each of the plurality of necessity outlets 180 may be connected to a necessary appliance within a building. For example, the plurality of necessity outlets 180 may be connected to a refrigerator, a heater, a hot water dispenser, and/or a light source. Moreover, the plurality of necessity outlets 180 may be used as a backup power source.

The processing unit 163 executing the app may allow the stepped battery 150 to discharge power therefrom at a reduced power level compared to normal operation described above (i.e., increase power to the EV outlet 140) while the power inlet 120 fans to receive power from the power outlet 10. More specifically, the processing unit 163 may allow the stepped battery 150 to provide the power output at 120-volt (V) and 15 amperes (A) for the necessary appliance connected to each of the plurality of necessity outlets 180. However, the processing unit 163 may prevent use of the stepped battery 150 as the backup power source in response to determining the power outage has not occurred, as described above, and instead is a result of the tripped circuit breaker.

As such, the plurality of necessity outlets 180 may be enabled during an emergency event, such as a power outage. Also, the stepped battery 150 may only operate as the backup power source during the emergency event. Conversely the processing unit 163 may prevent power from being sent to the EV outlet 140 by the stepped battery 150 while at least one of the plurality of necessity outlets 180 are enabled and/or during detection of the emergency event.

During use, the power splitting device 100 may operate as a plug-and-play device. The power splitting device 100 may be quickly used by plugging into the power outlet 10 without requiring installation by an electrical technician, modification to an electric panel, and/or seeking approval from a state regulator.

Therefore, the power splitting device 100 may provide simultaneous use of the dryer 20 and/or EVSE 30. Also, the power splitting device 100 may increase the amperage level for the EVSE 30 during normal use.

Figure 2:
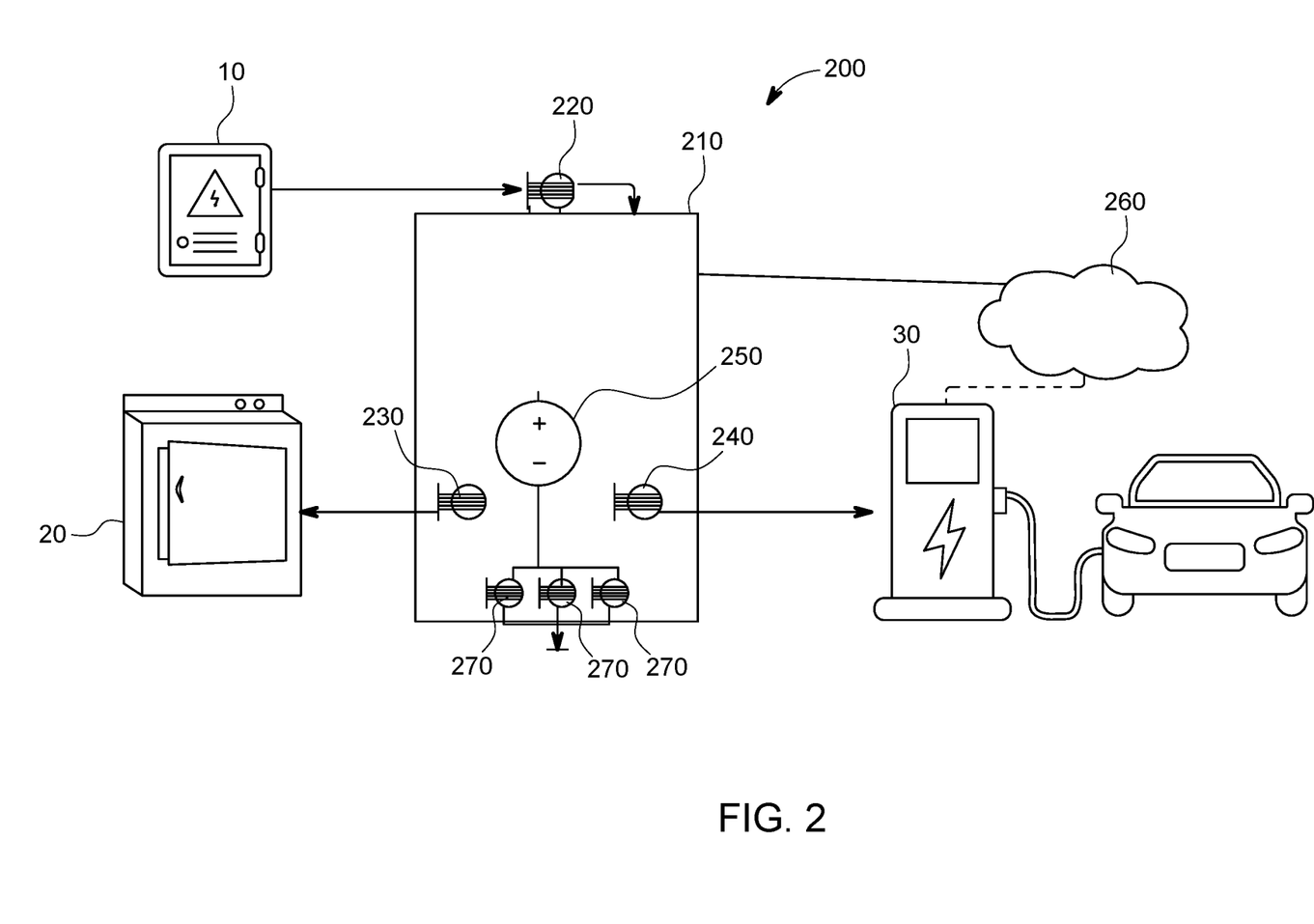
FIG. 2 illustrates a schematic view of a power splitting device, according to another exemplary embodiment of the present general inventive concept.

FIG. 2 illustrates a schematic view of a power splitting device 200, according to another exemplary embodiment of the present general inventive concept.

The power splitting device 200 may be constructed from at least one of metal, plastic, wood, glass, and rubber, etc., but is not limited thereto.

The power splitting device 200 may include a main body 210, a power inlet 220, a dryer outlet 230, an electric vehicle (EV) outlet 240, a stepped battery 250, an electric vehicle supply equipment controller 260, and a plurality of necessity outlets 270, but is not limited thereto.

The main body 210 may be constructed to have ingress protection (IP). Specifically, the main body 210 may have an IP rating of sixty-seven (67) to protect against foreign matter that may cause electrical faults, fire, and/or an explosion. The main body 210 may be a portable size. Moreover, the main body 210 may be removably (i.e., detachably) connected to at least a portion of a power outlet 10.

The power inlet 220 may be disposed on at least a portion of the main body 210. The power inlet 220 may be constructed as a two-prong plug, a three-prong plug, and/or a four-prong plug. In other words, the power inlet 220 may be constructed based on a type of the power outlet 10. Also, the power inlet 220 may include a cord of a predetermined length (e.g., two feet, five feet, ten feet, twenty feet) based on a preference of a user and/or a manufacturer. The variability in length of the cord may provide flexibility in placement and/or usage of the main body 210.

The power inlet 220 may be removably connected (i.e., inserted) within the power outlet 10. More specifically, the power inlet 220 may removably connect to a 240-volt (V) and 30 amperes (A) power outlet.

The dryer outlet 230 may be disposed on at least a portion of the main body 210. The dryer outlet 230 may be constructed as a two-prong plug, a three-prong plug, and/or a four-prong plug. In other words, the dryer outlet 230 may be constructed based on a type of a power inlet of a dryer 20 and/or any other device connected thereto. Also, the dryer outlet 230 may include a cord of a predetermined length (e.g., two feet, five feet, ten feet, twenty feet) based on the preference of the user and/or the manufacturer. The variability in length of the cord may provide flexibility in placement and/or usage of the main body 210.

The dryer outlet 230 may have a fixed configuration. For example, the dryer outlet 230 may output a 240V and 30 A of power. Additionally, the power output of the dryer outlet 230 may remain constant (i.e., stable) in response to the dryer 20 being connected thereto, due to most dryers requiring a stable power input from the power outlet 10. Thus, the dryer outlet 230 may receive a connection (e.g., a plug) from the dryer 20 therein. The dryer outlet 230 may provide power to the dryer 20 while the dryer 20 remains connected to the dryer outlet 230.

Alternatively, the dryer outlet 230 may be adjusted to have a variable configuration. More specifically, the power output of the dryer outlet 230 may be adjusted based on the type of device connected thereto. However, the dryer outlet 230 may remain constant and/or unchangeable in response to the dryer outlet 230 being connected to the dryer 20.

The EV outlet 240 may be disposed on at least a portion of the main body 210. The EV outlet 240 may be constructed as a two-prong plug, a three-prong plug, and/or a four-prong plug. In other words, the EV outlet 240 may be constructed based on a type of a power inlet of an electric vehicle supply equipment (EVSE) 30 and/or any other device connected thereto. Also, the EV outlet 240 may include a cord of a predetermined length (e.g., two feet, five feet, ten feet, twenty feet) based on the preference of the user and/or the manufacturer. The variability in length of the cord may provide flexibility in placement and/or usage of the main body 210.

The EV outlet 240 may have a variable configuration. The EV outlet 240 may output 240V and 50 amperes (A) of power. Thus, the power output of the EV outlet 240 may be greater than the power output of the dryer outlet 230. However, the EV outlet 240 may output the amperage based on needs of an EV connected to the EVSE 30, such as increasing an amperage level and/or decreasing the amperage level. Thus, the EV outlet 240 may receive a connection (e.g., a plug) from the EVSE 30 therein. The EV outlet 240 may provide power to the EVSE 30 while the EVSE 30 remains connected to the EV outlet 240.

Each cord used for the power inlet 220, the dryer outlet 230, and/or the EV outlet 240 may be based on needs of the user and/or a location of residence (e.g., rental). For example, the EVSE 30 may be located in a garage and/or outside of the garage, while the dryer 20 is within the residence. Accordingly, each cord for the power inlet 220, the dryer outlet 230, and/or the EV outlet 240 may have variable length to easily connect to the power inlet 10 and/or the dryer 20 while being able to reach the EVSE 30.

The stepped battery 250 may include a rechargeable battery, but is no limited thereto. For example, the stepped battery 250 may include a lithium-ion (Li-ion) battery, a lithium-ion polymer (Li-ion polymer) battery, a nickel-cadmium (NiCd) battery, a nickel-iron (NiFe) battery, a nickel-metal hydride (NiMH) battery, a sodium-ion battery, a vanadium redox battery, a molten salt battery, a quantum battery, and/or any combination thereof, but is not limited thereto.

The stepped battery 250 may be disposed within at least a portion of the main body 210. The stepped battery 250 may charge in response to receiving power from the power inlet 220.

However, the stepped battery 250 may discharge power therefrom to add, supplement, and/or increase (i.e., step up) the amperage level to the EV outlet 240 during use. More specifically, the stepped battery 250 may increase the amperage level to the EV outlet 240 from 30 A to 50 A and/or 60 A in response to the EVSE 30 being connected to the EV. Thus, the amperage level of the EV outlet 240 may be greater than the amperage level from the power inlet 220. As such, in absence of the EV outlet 240 being connected to the EV via the EVSE 30, the EV outlet 240 may default to 30 A based on the power from the power inlet 220.

The electric vehicle supply equipment (EVSE) controller 260 may include a computing device, a computer, a processor, a central processing unit (CPU), a microcontroller, an input device (e.g., a keyboard, a mouse, a keypad, a touchscreen), a memory (e.g., random access memory, read-only memory), a storage device (e.g., a hard disk drive, a solid-state drive, cloud storage), a network connection, a wired connection, and a wireless connection, but is not limited thereto.

The EVSE controller 260 may be connected to the stepped battery 250 and/or the main body 210. The EVSE controller 260 may access the Internet to access a website, and/or may allow a mobile application and/or the software application to be executed thereon. For ease of description, the mobile and/or the software application will be hereinafter referred to as an app. The app may be downloaded from the Internet to be stored on the EVSE controller 260.

The EVSE controller 260 executing the app may have configuration and/or settings adjusted thereon.

The EVSE controller 260 executing the app may monitor the power output from the EV outlet 240. Additionally, the EVSE controller 260 may determine a type of device connected to the EV outlet 140 to adjust the power output accordingly. For example, the EVSE controller 260 may activate the stepped battery 250 to increase the amperage level (e.g., from 30 A to 50 A and/or 60 A) from the EV outlet 240 in response to determining the EVSE 30 is charging the EV.

Moreover, the EVSE controller 260 may monitor the power output to the EV outlet 240. The EVSE controller 260 may adjust the power output to the EV outlet 240. For example, the EVSE controller 260 may adjust the power output to the EV outlet 240 from 9.6 kW and/or 11 kW for charging of the EV to 7.7 kW in response to determining the dryer outlet 230 is drawing power based on use of the dryer 20. In other words, the EVSE controller 260 may maintain the power output to the EV outlet 240 as 9.6 kW and/or 11 kW in absence of use of the dryer 20.

It is important to note that the EVSE controller 260 may allow simultaneous power output to the dryer outlet 230 and/or the EV outlet 240 without degradation of the power output. The EVSE controller 260 may allow continuous full power output to the dryer outlet 230 and/or the EV outlet 240, such that neither the dryer outlet 230 nor the EV outlet 240 decrease the power output due to use of the stepped battery 250 to supplement the power output to the EV outlet 240. In other words, the dryer outlet 230 and/or the EV outlet 240 may simultaneously and/or continuously provide power without a reduction of the power output of the other.

Furthermore, the EVSE controller 260 executing the app may limit access to the stepped battery 250 in response to loss of power received by the power inlet 220 (i.e., a power outage). The EVSE controller 260 may prevent access to power from the stepped battery 250 during a power outage, such that the EV outlet 240 may no longer receive power and/or the increase in the amperage level.

The EVSE controller 260 executing the app may monitor operation of the EVSE 30 based on the power output used by the dryer EV outlet 240. The EVSE controller 260 may send an alert (e.g., a usage signal) to be displayed thereon showing amount of charge and/or expenses based on electricity used. Thus, a landlord could use EVSE controller 260 to calculate costs and/or expenses for a tenant renting the home and/or the apartment.

Additionally, the EVSE controller 260 may monitor a network (e.g., websites) to confirm loss of power received by the power inlet 220 is based on the power outage.

The plurality of necessity outlets 270 may be disposed on at least a portion of the main body 210 and/or connected to the stepped battery 250. Each of the plurality of necessity outlets 270 may be connected to a necessary appliance within a building. For example, the plurality of necessity outlets 270 may be connected to a refrigerator, a heater, a hot water dispenser, and/or a light source. Moreover, the plurality of necessity outlets 270 may be used as a backup power source.

The stepped battery 150 may discharge power therefrom at a reduced power level compared to normal operation described above (i.e., increase power to the EV outlet 240) while the power inlet 220 fails to receive power from the power outlet 10. Moreover, the stepped battery 250 may provide the power output at 120-volt (V) and 15 amperes (A) for the necessary appliance connected to each of the plurality of necessity outlets 270. However, the EVSE controller 260 may prevent use of the stepped battery 250 as the backup power source in response to determining the power outage has not occurred, as described above.

As such, the plurality of necessity outlets 270 may be enabled during an emergency event, such as a power outage. Also, the stepped battery 250 may only operate as the backup power source during the emergency event. Conversely the EVSE controller 260 may prevent power from being sent to the EV outlet 240 by the stepped battery 250 while at least one of the plurality of necessity outlets 270 are enabled and/or during detection of the emergency event.

During use, the power splitting device 200 may operate as a plug-and-play device. The power splitting device 200 may be quickly used by plugging into the power outlet 10 without requiring installation by an electrical technician, modification to an electric panel, and/or seeking approval from a state regulator.

Therefore, the power splitting device 200 may provide simultaneous use of the dryer 20 and/or EVSE 30. Also, the power splitting device 200 may increase the amperage level for the EVSE 30 during normal use.

The present general inventive concept may include a power splitting device 100, including a main body 110, a power inlet 120 disposed on at least a portion of the main body 110 to removably connect the main body 110 to a power outlet 10, a dryer outlet 130 disposed on at least a portion of the main body 110 to receive a connection from a dryer 20 therein and provide power received from the power inlet 10 to the dryer 20, an electric vehicle (EV) outlet 140 disposed on at least a portion of the main body 110 to receive a connection from an electric vehicle supply equipment (EVSE) 30 therein and provide power received from the power inlet 10 to the EVSE 30, such that the power output of the EV outlet 140 is greater than the dryer outlet 130, a stepped battery 150 disposed within at least a portion of the main body 110 to send power to the EV outlet 140, and a control unit 160 disposed within at least a portion of the main body 110 to monitor power output from at least one of the dryer outlet 130 and the EV outlet 140, and adjust the power output based on a setting.

The dryer outlet 130 may be fixed to 240V and 30 A for the power output.

The EV outlet 140 may be fixed to 240V and 50 A for the power output.

The EV outlet 140 may have an increased amperage level with respect to an amperage level of the power inlet 120 in response to receiving power from the stepped battery 150.

The control unit 160 may allow simultaneous output of the power output to the dryer outlet 130 and the EV outlet 140.

The control unit 160 may prevent degradation of the power output to the dryer outlet 130 and the EV outlet 140 during simultaneous output of the power output.

The control unit 160 may enforce overcurrent protection in response to determining at least one of the dryer outlet 130 and the EV outlet 140 exceed a predetermined outlet threshold.

The control unit 160 may enforce overheating protection in response to determining the stepped battery 150 has exceeded a predetermined temperature level.

The control unit 160 may separate the power output for the dryer outlet 130 to receive power only from the power inlet 120 and the EV outlet 140 to receive power only from the stepped battery 150.

The EV outlet 140 may receive power only from the stepped battery 150 and the amperage level of the EV outlet 140 remains steady.

The EV outlet 140 may receive 240V and 30 A for the power output while the EV outlet 140 receives power only from the stepped battery 150.

The control unit 160 may prevent access to the stepped battery 150 in response to a battery capacity falling below a predetermined threshold.

The control unit 160 may automatically disable the power output to the EV outlet 140 in response to determining an unauthorized vehicle is connected to the EVSE 30.

The control unit 160 may automatically disable receipt of power by the power inlet 120 and the power output from the dryer outlet 130 and the EV outlet 140 in response to contact of at least one of an outer surface of the main body 110 and an inner surface of the main body 110 by a user to prevent risk of electrical shock.

The power splitting device 100 may further include a communication unit 170 disposed within at least a portion of the main body 110 to facilitate communication and control of the control unit 160 with an external device 40, such that the control unit 160 may send an alert using the communication unit 170 to the external device 40 in response to detecting completion of a drying cycle by the dryer 20.

The control unit 160 may monitor the external device 40 to determine a loss of power to the power inlet 120 is based on at least one of a power outage and a tripped circuit breaker.

The power splitting device 100 may further include a plurality of necessity outlets 180 disposed on at least a portion of the main body 110 to provide the power output only from the stepped battery 150 in response to the control unit 160 determining the loss of power is based on the power outage, such that the control unit 160 may allow the stepped battery 150 to provide the power output at 120V and 15 A to each of the plurality of necessity outlets 180.

The control unit 160 may notify an external device 40 in response to determining the loss of power is based on the tripped circuit breaker.

The present general inventive concept may also include a power splitting device 200, including a main body 210, a power inlet 220 disposed on at least a portion of the main body 210 to removably connect the main body 210 to a power outlet 10, a dryer outlet 230 disposed on at least a portion of the main body 210 to receive a connection from a dryer 20 therein and provide power received from the power inlet 220 to the dryer 20, an electric vehicle (EV) outlet 240 disposed on at least a portion of the main body 210 to receive a connection from an electric vehicle supply equipment (EVSE) 30 therein and provide power received from the power inlet 220 to the EVSE 30, and a stepped battery 250 disposed within at least a portion of the main body 210 to increase an amperage level of the EV outlet 240.

The dryer outlet 230 and the EV outlet 240 may provide power simultaneously without a reduction of power.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A power splitting device, comprising:
a main body;
a power inlet disposed on at least a portion of the main body to removably connect the main body to a power outlet;
a dryer outlet disposed on at least a portion of the main body to receive a connection from a dryer therein and provide power received from the power inlet to the dryer;
an electric vehicle (EV) outlet disposed on at least a portion of the main body to receive a connection from an electric vehicle supply equipment (EVSE) therein and provide power received from the power inlet to the EVSE, such that the power output of the EV outlet is greater than the dryer outlet;
a stepped battery disposed within at least a portion of the main body to send power to the EV outlet; and
a control unit disposed within at least a portion of the main body to monitor power output from at least one of the dryer outlet and the EV outlet, and adjust the power output based on a setting,
wherein the control unit allows simultaneous output of the power output to the dryer outlet and the EV outlet.

2. The power splitting device of claim 1, wherein the dryer outlet is fixed to 240V and 30 A for the power output.

3. The power splitting device of claim 1, wherein the EV outlet is fixed to 240V and 50 A for the power output.

4. The power splitting device of claim 1, wherein the EV outlet has an increased amperage level with respect to an amperage level of the power inlet in response to receiving power from the stepped battery.

5. A power splitting device, comprising:
a main body;
a power inlet disposed on at least a portion of the main body to removably connect the main body to a power outlet;
a dryer outlet disposed on at least a portion of the main body to receive a connection from a dryer therein and provide power received from the power inlet to the dryer;
an electric vehicle (EV) outlet disposed on at least a portion of the main body to receive a connection from an electric vehicle supply equipment (EVSE) therein and provide power received from the power inlet to the EVSE, such that the power output of the EV outlet is greater than the dryer outlet;
a stepped battery disposed within at least a portion of the main body to send power to the EV outlet; and
a control unit disposed within at least a portion of the main body to monitor power output from at least one of the dryer outlet and the EV outlet, and adjust the power output based on a setting, wherein the control unit prevents degradation of the power output to the dryer outlet and the EV outlet during simultaneous output of the power output.

6. The power splitting device of claim 1, wherein the control unit enforces overcurrent protection in response to determining at least one of the dryer outlet and the EV outlet exceed a predetermined outlet threshold.

7. A power splitting device, comprising:
a main body;
a power inlet disposed on at least a portion of the main body to removably connect the main body to a power outlet;
a dryer outlet disposed on at least a portion of the main body to receive a connection from a dryer therein and provide power received from the power inlet to the dryer;
an electric vehicle (EV) outlet disposed on at least a portion of the main body to receive a connection from an electric vehicle supply equipment (EVSE) therein and provide power received from the power inlet to the EVSE, such that the power output of the EV outlet is greater than the dryer outlet;
a stepped battery disposed within at least a portion of the main body to send power to the EV outlet; and
a control unit disposed within at least a portion of the main body to monitor power output from at least one of the dryer outlet and the EV outlet, and adjust the power output based on a setting, wherein the control unit enforces overheating protection in response to determining the stepped battery has exceeded a predetermined temperature level.

8. A power splitting device, comprising:
a main body;
a power inlet disposed on at least a portion of the main body to removably connect the main body to a power outlet;
a dryer outlet disposed on at least a portion of the main body to receive a connection from a dryer therein and provide power received from the power inlet to the dryer;
an electric vehicle (EV) outlet disposed on at least a portion of the main body to receive a connection from an electric vehicle supply equipment (EVSE) therein and provide power received from the power inlet to the EVSE, such that the power output of the EV outlet is greater than the dryer outlet;
a stepped battery disposed within at least a portion of the main body to send power to the EV outlet; and
a control unit disposed within at least a portion of the main body to monitor power output from at least one of the dryer outlet and the EV outlet, and adjust the power output based on a setting, wherein the control unit separates the power output for the dryer outlet to receive power only from the power inlet and the EV outlet to receive power only from the stepped battery.

9. A power splitting device, comprising:
a main body;
a power inlet disposed on at least a portion of the main body to removably connect the main body to a power outlet;

a dryer outlet disposed on at least a portion of the main body to receive a connection from a dryer therein and provide power received from the power inlet to the dryer;

an electric vehicle (EV) outlet disposed on at least a portion of the main body to receive a connection from an electric vehicle supply equipment (EVSE) therein and provide power received from the power inlet to the EVSE, such that the power output of the EV outlet is greater than the dryer outlet;

a stepped battery disposed within at least a portion of the main body to send power to the EV outlet; and a control unit disposed within at least a portion of the main body to monitor power output from at least one of the dryer outlet and the EV outlet, and adjust the power output based on a setting, wherein the EV outlet receives power only from the stepped battery and the amperage level of the EV outlet remains steady.

10. A power splitting device, comprising:

a main body;

a power inlet disposed on at least a portion of the main body to removably connect the main body to a power outlet;

a dryer outlet disposed on at least a portion of the main body to receive a connection from a dryer therein and provide power received from the power inlet to the dryer;

an electric vehicle (EV) outlet disposed on at least a portion of the main body to receive a connection from an electric vehicle supply equipment (EVSE) therein and provide power received from the power inlet to the EVSE, such that the power output of the EV outlet is greater than the dryer outlet;

a stepped battery disposed within at least a portion of the main body to send power to the EV outlet; and a control unit disposed within at least a portion of the main body to monitor power output from at least one of the dryer outlet and the EV outlet, and adjust the power output based on a setting, wherein the EV outlet receives 240V and 30 A for the power output while the EV outlet receives power only from the stepped battery.

11. A power splitting device, comprising:

a main body;

a power inlet disposed on at least a portion of the main body to removably connect the main body to a power outlet;

a dryer outlet disposed on at least a portion of the main body to receive a connection from a dryer therein and provide power received from the power inlet to the dryer;

an electric vehicle (EV) outlet disposed on at least a portion of the main body to receive a connection from an electric vehicle supply equipment (EVSE) therein and provide power received from the power inlet to the EVSE, such that the power output of the EV outlet is greater than the dryer outlet;

a stepped battery disposed within at least a portion of the main body to send power to the EV outlet; and a control unit disposed within at least a portion of the main body to monitor power output from at least one of the dryer outlet and the EV outlet, and adjust the power output based on a setting, wherein the control unit prevents access to the stepped battery in response to a battery capacity falling below a predetermined threshold.

12. A power splitting device, comprising:

a main body;

a power inlet disposed on at least a portion of the main body to removably connect the main body to a power outlet;

a dryer outlet disposed on at least a portion of the main body to receive a connection from a dryer therein and provide power received from the power inlet to the dryer;

an electric vehicle (EV) outlet disposed on at least a portion of the main body to receive a connection from an electric vehicle supply equipment (EVSE) therein and provide power received from the power inlet to the EVSE, such that the power output of the EV outlet is greater than the dryer outlet;

a stepped battery disposed within at least a portion of the main body to send power to the EV outlet; and a control unit disposed within at least a portion of the main body to monitor power output from at least one of the dryer outlet and the EV outlet, and adjust the power output based on a setting, wherein the control unit automatically disables the power output to the EV outlet in response to determining an unauthorized vehicle is connected to the EVSE.

13. A power splitting device, comprising:

a main body;

a power inlet disposed on at least a portion of the main body to removably connect the main body to a power outlet;

a dryer outlet disposed on at least a portion of the main body to receive a connection from a dryer therein and provide power received from the power inlet to the dryer;

an electric vehicle (EV) outlet disposed on at least a portion of the main body to receive a connection from an electric vehicle supply equipment (EVSE) therein and provide power received from the power inlet to the EVSE, such that the power output of the EV outlet is greater than the dryer outlet;

a stepped battery disposed within at least a portion of the main body to send power to the EV outlet; and a control unit disposed within at least a portion of the main body to monitor power output from at least one of the dryer outlet and the EV outlet, and adjust the power output based on a setting, wherein the control unit automatically disables receipt of power by the power inlet and the power output from the dryer outlet and the EV outlet in response to contact of at least one of an outer surface of the main body and an inner surface of the main body by a user to prevent risk of electrical shock.

14. A power splitting device, comprising:

a main body;

a power inlet disposed on at least a portion of the main body to removably connect the main body to a power outlet;

a dryer outlet disposed on at least a portion of the main body to receive a connection from a dryer therein and provide power received from the power inlet to the dryer;

an electric vehicle (EV) outlet disposed on at least a portion of the main body to receive a connection from an electric vehicle supply equipment (EVSE) therein and provide power received from the power inlet to the EVSE, such that the power output of the EV outlet is greater than the dryer outlet;

a stepped battery disposed within at least a portion of the main body to send power to the EV outlet;

a control unit disposed within at least a portion of the main body to monitor power output from at least one of the dryer outlet and the EV outlet, and adjust the power output based on a setting; and a communication unit disposed within at least a portion of the main body to facilitate communication and control of the control unit with an external device, such that the control unit sends an alert using the communication unit to the external device in response to detecting completion of a drying cycle by the dryer.

15. A power splitting device, comprising:

a main body;

a power inlet disposed on at least a portion of the main body to removably connect the main body to a power outlet;

a dryer outlet disposed on at least a portion of the main body to receive a connection from a dryer therein and provide power received from the power inlet to the dryer;

an electric vehicle (EV) outlet disposed on at least a portion of the main body to receive a connection from an electric vehicle supply equipment (EVSE) therein and provide power received from the power inlet to the EVSE, such that the power output of the EV outlet is greater than the dryer outlet;

a stepped battery disposed within at least a portion of the main body to send power to the EV outlet; and a control unit disposed within at least a portion of the main body to monitor power output from at least one of the dryer outlet and the EV outlet, and adjust the power output based on a setting, wherein the control unit monitors the external device to determine a loss of power to the power inlet is based on at least one of a power outage and a tripped circuit breaker.

16. The power splitting device of claim 15, further comprising:

a plurality of necessity outlets disposed on at least a portion of the main body to provide the power output only from the stepped battery in response to the control unit determining the loss of power is based on the power outage, such that the control unit allows the stepped battery to provide the power output at 120V and 15 A to each of the plurality of necessity outlets.

17. The power splitting device of claim 15, wherein the control unit notifies an external device in response to determining the loss of power is based on the tripped circuit breaker.

18. A power splitting device, comprising:

a main body;

a power inlet disposed on at least a portion of the main body to removably connect the main body to a power outlet;

a dryer outlet disposed on at least a portion of the main body to receive a connection from a dryer therein and provide power received from the power inlet to the dryer;

an electric vehicle (EV) outlet disposed on at least a portion of the main body to receive a connection from an electric vehicle supply equipment (EVSE) therein and provide power received from the power inlet to the EVSE; and a stepped battery disposed within at least a portion of the main body to increase an amperage level of the EV outlet, wherein the dryer outlet and the EV outlet provide power simultaneously without a reduction of power.

* * * * *